(12) United States Patent
Kuzuya et al.

(10) Patent No.: US 7,097,180 B2
(45) Date of Patent: Aug. 29, 2006

(54) WEATHER STRIP

(75) Inventors: Hiroshi Kuzuya, Aichi (JP); Masaki Ohashi, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 114 days.

(21) Appl. No.: 10/771,627

(22) Filed: Feb. 5, 2004

(65) Prior Publication Data

US 2004/0227306 A1    Nov. 18, 2004

(30) Foreign Application Priority Data

Feb. 7, 2003 (JP) ............................ P2003-030422
Feb. 10, 2003 (JP) ............................ P2003-031820

(51) Int. Cl.
*F16J 15/02* (2006.01)

(52) U.S. Cl. ............ 277/644; 277/648; 277/921; 49/495.1

(58) Field of Classification Search ........... 277/921, 277/628, 639, 642, 644, 648; 49/495.1, 498.1, 49/506, 490.1
See application file for complete search history.

(56) References Cited

U.S. PATENT DOCUMENTS

| 5,143,772 A | | 9/1992 | Iwasa |
| 5,170,587 A | * | 12/1992 | Nakatani et al. ............ 49/490.1 |
| 5,437,124 A | * | 8/1995 | Ahlfeld et al. ............. 49/479.1 |
| 6,464,293 B1 | * | 10/2002 | Nozaki .................. 296/216.09 |
| 6,520,563 B1 | | 2/2003 | Nozaki |
| 6,684,575 B1 | * | 2/2004 | Oda et al. ................... 49/498.1 |
| 6,686,020 B1 | * | 2/2004 | Sakuma ...................... 428/122 |
| 2003/0051411 A1 | | 3/2003 | Nozaki et al. |

FOREIGN PATENT DOCUMENTS

| JP | Y2-2584752 | 9/1998 |
| JP | Y2-2604441 | 3/2000 |
| JP | A-2002-187500 | 7/2002 |
| JP | A-2002-337552 | 11/2002 |

* cited by examiner

*Primary Examiner*—Vishal Patel
(74) *Attorney, Agent, or Firm*—Posz Law Group, PLC

(57) ABSTRACT

A weather strip is attached over the entire surrounding part of a door opening of a vehicle. The weather strip is formed by extrusion-molding, and has a trimming portion having a substantially U-shaped cross section and a hollow seal portion. A first projection portion and a second projection portion are formed on an outer face of an outer side wall part of the trimming portion in such a way as to extend to the outside of the vehicle. The seal portion has an end part connected to a leading end part of the first projection portion, and also has the other end part connected to a leading end part of the second projection portion. The second projection portion is placed at the side of an outer periphery of the weather strip, that is, at the side at which an amount of bending-deformation increases when the corner portion of the weather strip is formed. The second projection portion has a thickness along the outer side wall part and a projection length, each of which is larger than a thickness of a general part of the seal portion. A sponge layer extending from the seal portion may be provided on an outer surface side of the second projection portion.

19 Claims, 3 Drawing Sheets

RELATED ART

WEATHER STRIP

The present application is based on Japanese Patent Applications No. 2003-030422 and 2003-031820, which are incorporated herein by reference.

BACKGROUND OF THE INVENTION

1. Field of Invention

The present invention relates to a weather strip provided along a surrounding part of a door opening of a vehicle and more particularly to a weather strip having a hollow seal portion.

2. Description of the Related Art

Generally, a weather strip is provided along a surrounding part of a door opening of a vehicle, such as an automobile. As shown in FIG. 5, a weather strip 70 includes a trimming portion 72, which has a substantially U-shaped cross section and held by being fitted into a flange 71 formed in a surrounding part of a door opening, and also includes a hollow seal portion 73 provided in such a way as to protrude from the trimming portion 72. When a door is closed, the seal portion 73 is pressure-contacted to an edge portion of the door, so that the space between the door and a body is sealed. Most of or the entirety of the circumference of the weather strip 70 is formed by extrusion molding.

However, when a corner portion of the weather strip 70 is formed corresponding to a corner portion of the surrounding part of the door opening, especially, to a place at which a bending angle is very acute (that is, a place at which the corner portion is bent so that the angle is a smaller acute one), there is a fear of occurrence of drawbacks in that the seal portion 73 is collapsed, and that a double outside line (that is, an outer circumferential line of the seal portion and that of the trimming portion) is formed. Therefore, the following countermeasures are taken. That is, an occurrence of crushing deformation is prevented by, for example, inserting a pad into the seal portion 73 (see, for instance, Japanese Utility Model Registration No. 2,604,441). Alternatively, a corner part of the seal portion 73 is cut off and then, this part is remolded by injection molding. Alternatively, all corner portions of the weather strip are molded by injection molding.

However, in the case of utilizing a pad, the pad, that is, an additional separate member is needed. There is a fear of occurrences of drawbacks in that the production cost of a weather strip increases, and that the manufacturing process thereof is complicated. When the cutout parts and the corner portions are remolded, an additional step becomes necessary. Thus, there is a fear of occurrences of similar drawbacks. Moreover, the difference in quality between the extrusion-molding part and the injection-molding part occurs. This may result in deterioration in the appearance of a vehicle. Thus, there is a fear of degradation in the quality of the appearance of the vehicle.

FIG. 6 shows another example of the weather strip 50. As shown in FIG. 6, a weather strip 50 includes a trimming portion 52, which has a substantially U-shaped cross section and held by being fitted into a flange 51 formed in a surrounding part of a door opening, and also includes a hollow seal portion 53 provided in such a way as to protrude from the trimming portion 52. When a door is closed, the seal portion 53 is pressure-contacted with an edge portion of the door, so that the space between the door and a body is sealed.

Usually, the trimming portion 52 requires sufficient stiffness. Thus, the trimming portion 52 is formed of solid rubber (non-foam). The seal portion 53 requires flexibility. Thus, the seal portion 53 is formed of sponge rubber (foam). To prevent the seal portion 53 from being fallen down, projection portions 55 and 56 are formed on a vehicular outer side surface of a vehicular outer side wall part 54 of the trimming portion 52 at a connection portion between the trimming portion 52 and the seal portion 53 in such a way as to extend outwardly therefrom. The seal portion 53 is connected to leading end parts of the projection portions 55, 56. For the purposes of preventing the seal portion 53 from being worn away by the pressure-contact between the seal portion 53 and the door and of enhancing the durability of the seal portion 53, a film layer 57 is provided on an outer surface of each of the seal portion 53 and the projection portion 56 (see, for example, Japanese Utility Model Registration No. 2,584,752).

However, the film layer 57 is relatively thin, so that an outside line due to material differences, such as polish and surface roughness, occurs at a boundary portion (that is, the leading end part of the projection portion 56) between the seal portion 53 made of sponge rubber and the projection portion 56 made of solid rubber. Because of the facts that the seal portion 53 is made of foam, and that the projection portion 56 is made of non-foam, there is a fear that a slight step-like portion is formed between the seal portion 53 and the projection portion 56. Therefore, in the case that such an outside line or a step-like portion is placed on a design surface (for instance, a part that can relatively easily and visually be identified from the outside of a vehicle) of the weather strip 50, there is a fear that deterioration of appearance thereof and degradation in the quality of the appearance thereof occur. After the weather strip 50 is formed, surface treatment is sometimes performed on the surface of the seal portion 53 so as to obscure the outside line and the step-like portion. However, there are fears that the production cost of a weather strip increases, and that the process of manufacturing the weather strip is complicated.

Incidentally, according to the weather strip described in Japanese Utility Model Registration No. 2,584,752, in a boundary portion between a body portion and the film layer, a region, in which the quality of the material is gradually changed, is provided therebetween by tapering off the film layer toward an end part thereof in the vicinity of the boundary portion. However, even when tapering off the film layer toward an end thereof (that is, providing the region in which the quality of the material is gradually changed), it is difficult to eradicate the aforementioned outside line at the end part thereof. Thus, even when this technique is applied thereto and when the seal portion 53 is tapered off toward an end thereof in the boundary portion between the seal portion 53 and the projection portion 56, in the case where the end part (thus, the boundary portion) is placed on the design surface, drawbacks similar to the aforementioned ones may occur owing to the emergence of the outside line and the step-like portion.

SUMMARY OF THE INVENTION

The invention is accomplished so as to solve the aforementioned problems. Accordingly, an object of the invention is to provide a weather strip that can prevent a seal portion in a corner portion thereof from being collapsed, and that can enhance productivity. Another object is to provide a weather strip enabled to prevent an outside line from occurring due to the material difference, and also enabled to enhance the quality of the appearance of a weather strip.

According to a first aspect of the invention, there is provided a weather strip that has a trimming portion having a substantially U-shaped cross section, which is attached to a surrounding part of a door opening of a vehicle. The trimming portion has an outer side wall portion, an inner side wall portion, and a connecting portion for connecting both the side wall portions to each other. This weather strip also has a hollow seal portion that is connected to the trimming portion at a first connection portion, which is placed substantially at a boundary portion between the connecting portion and the outer side wall portion, and at a second connection portion, which is placed closer to a leading end of the outer side wall portion than the first connection portion, and adapted to be more flexible than the trimming portion and to be pressure-contacted to a peripheral portion of the door when the door is closed. This weather strip comprising a projecting portion provided in the second connection portion in such a way as to extend from the outer side wall portion of the trimming portion. A thickness of the projecting portion along a direction, in which the outer side wall portion extends, is larger than a thickness of a part of the seal portion, which is pressure-contacted to the peripheral portion of the door at the part thereof.

According to the above structure, at a base part of the seal portion, at the side where an amount of the bending deformation increases when the corner portion of the weather strip is formed, the projecting portion is formed in such a way as to extend from the trimming portion, which has stiffness higher than that of the seal portion, and the thickness of the projecting portion is set to be relatively large. Thus, an occurrence of collapse of the seal portion at the time of forming the corner portion can be prevented. Consequently, this eliminates the necessity for insertion of a pad and for injection molding of the seal portion. Thus, reduction in the production cost and simplification of the manufacturing process can be achieved. Because of the facts that no difference in quality between the extrusion-molding part and the injection-molding part occurs, and that the degree of deformation of the seal portion decreases, the weather strip according to the invention has an advantage in enhancing the quality of the appearance. The weather strip of the aforementioned configuration prevents an occurrence of the drawback that even when the bending-deformation of the seal portion occurs when the door is closed, a double outside line is formed. Additionally, the weather strip of the aforementioned configuration prevents increase in the bending load at the time of closing the door, which is caused by the insertion of the pad thereto, that is, increase in the reaction force in the seal portion. Thus, there is little influence on the closing property of the door. Incidentally, in the present application, the "base end portion" of the projecting portion designates a position corresponding to an outer surface of the outer side wall (that is, the position denoted by "B" in FIG. 3), that is, a part located at a place that is apart from the inner surface of the trimming portion of the side wall by a thickness of the side wall. Further, the thickness of the base end portion (to be described later) is denoted by W1 in FIG. 3. The projection length is designated by "h". The thickness of the leading end part of the projecting portion is denoted by "W2". The thickness of the seal portion is denoted by "T".

A thickness of a base end part of the projecting portion is preferably equal to or more than twice a thickness of the part of the seal portion.

According to the above, the effects of the present invention can be enhanced. Incidentally, in the foregoing description, the expression "equal to or more than twice a thickness of the part of the seal portion" can be replaced with the following expression "equal to or more than twice a thickness of the part of the seal portion and equal to or less than six times the thickness thereof". It is sufficient for reducing the amount of the bending-deformation at the time of forming the corner portion of the weather strip to increase the stiffness of each the seal portion and the projecting portion. When the stiffness of each the seal portion and the projecting portion is increased, the bending load on the seal portion at the time of closing the door increases. That is, there is a fear of increase in the reaction force of the seal portion and of degradation in the closing property of the door. In view of this, the thickness of the base end part of the projecting portion is set to be equal to or more than twice the thickness of the part pressure-contacted to the peripheral portion of the door and equal to or less than six times the thickness of this part. Thus, the above structure provides a well-balanced weather strip in consideration of the relevance among the amount of the bending deformation, the bending load, the sealability, and the closing property of the door. In the case where, for example, at least a side surface of both the inner side surface and the outer side surface of the projecting portion and a side surface of the outer side wall portion meet substantially at right angles, it is more preferable that the thickness of the base end part of the projecting portion is equal to or more than twice the thickness of the part of the seal portion, which is pressure-contacted to the peripheral portion of the door, and equal to and less than four times the thickness of this part. Incidentally, when the thickness of the base end part of the projecting portion is less than twice the thickness of the part of the seal portion, which is pressure-contacted to the peripheral portion of the door, there is a fear that the projecting portion cannot have desired stiffness that is sufficient for eliminate the aforementioned drawbacks. Conversely, in a case that the thickness of the base end portion increases too much (for instance, more than six times the thickness of the part of the seal portion, which is pressure-contacted to the peripheral portion of the door), the stiffness becomes too high, with the result of occurrences of drawbacks, such as increase in the bending load.

In an embodiment of the invention, a thickness of base end part of the projecting portion is preferably equal to or more than one-fourth of a length from a leading end part of the outer side wall portion to a boundary portion between the connecting portion and the base end part. The length from the leading end part of the outer side wall portion to the boundary portion between the connecting portion and the base end part is denoted by "W3" in FIG. 3.

The above structure enhances the effects of the invention still more. Incidentally, the expression "equal to or more than one-fourth of a length from a leading end part of the outer side wall portion to a boundary portion between the connecting portion and the base end part" in the foregoing description of the configuration can be replaced with the expression "equal to or more than one-fourth of a length from a leading end part of the outer side wall portion to a boundary portion between the connecting portion and the base end part and equal to or less than half of the length therefrom". In the case where, for example, at least a side surface of both the inner side surface and the outer side surface of the projecting portion and a side surface of the outer side wall portion meet substantially at right angles, it is more preferable that the thickness of the base end part of the projecting portion is equal to or more than one-fourth of the length W3, and equal to and less than one-third of the length W3.

In an embodiment of one of the above structures, thickness of a leading end part of the projecting portion is preferably equal to or more than twice a thickness of the part of the seal portion.

According to the above, the advantages of the invention are enhanced still more. Incidentally, the expression "equal to or more than twice a thickness of the part of the seal portion" in the foregoing description of the configuration can be replaced with the expression "equal to or more than twice a thickness of the part of the seal portion and equal to or less than three times the thickness of this part".

In an embodiment of the above structures of the invention, a projection length from a base end part of the projecting portion to a leading end part thereof is preferably larger than a thickness of the part of the seal portion.

According to the above, the advantages of the aforementioned structures are enhanced still more.

The projection length is preferably equal to or more than twice a thickness of the part of the seal portion.

According to the above, the advantages of the invention are enhanced still more. Incidentally, the expression "equal to or more than twice a thickness of the part of the seal portion" in the foregoing description of the configuration can be replaced with the expression "equal to or more than twice a thickness of the part of the seal portion and equal to or less than four times the thickness of the part thereof".

In an embodiment of the invention, a sectional area of the projecting portion is preferably equal to or more than four times an area obtained by square of a thickness of the part of the seal portion.

The advantages of the above structure enhanced still more. Incidentally, the expression "equal to or more than four times an area obtained by square of a thickness of the part of the seal portion" in the foregoing description of the configuration can be replaced with the expression "equal to or more than four times an area obtained by square of a thickness of the part of the seal portion and equal to or less than fourteen times the area obtained by square of the thickness of the part thereof". In the case where, for example, at least a side surface of both the inner side surface and the outer side surface of the projecting portion and a side surface of the outer side wall portion meet substantially at right angles, it is more preferable that the sectional area of the projecting portion is equal to or more than four times the area obtained by square of the thickness of the part of the seal portion and equal to or less than ten times the area obtained by square of the thickness of the part thereof.

In an embodiment of the invention, the entirety of the seal portion is preferably formed in such a way as to be placed closer to a side of the first connection portion than at least the second connection portion in the direction, in which the outer side wall portion extends.

According to the above, the weather strip is configured so that the entire seal portion does not project from the second connection portion in the direction of the outer periphery of the corner portion of the weather strip, in which the amount of the bending deformation increases, that is, so that the entire seal portion is provided closer to the inner periphery side of the corner portion than the second connection portion. Thus, the above weather strip can more effectively prevent the seal portion corresponding to a part of the corner portion from being collapsed. Moreover, it is more difficult to cause the drawback in that even when the seal portion is bend-deformed when the door is closed, a double outside line is formed. Consequently, the advantages of the above structures are enhanced still more. Incidentally, the configuration represented by the expression "the entirety of the seal portion is formed in such a way as to be placed closer to a side of the first connection portion than at least the second connection portion in the direction, in which the outer side wall portion extends" includes a configuration in which a part of the seal portion at the side of the second connection portion, that is, the side at which the amount of the bending deformation increases at the time of forming the corner portion of the weather strip extends in such a way as to be continued from the leading end part of the projecting portion to the rest of the projecting portion, and also extends toward the outside of the vehicle in such a manner as to be inclined to the inner periphery side of the weather strip attached to the surrounding part of the door opening.

In an embodiment of the invention, a thickness of the projecting portion preferably increases toward a base end portion thereof.

The above structure provides a well-balanced weather strip in consideration of the relevance among the amount of the bending deformation, the bending load, the sealability, and the closing property of the door.

The trimming portion is preferably made of solid rubber.

The seal portion is preferably made of sponge rubber.

Next, according to a second aspect of the invention, there is provided a weather strip having a trimming portion, cross-sectionally substantially-U-shaped and attached to a surrounding part of a door opening of a vehicle, including an outer side wall portion, an inner side wall portion, and a connecting portion for connecting both the side wall portions, so that each of the side wall portions and the connecting portion is formed of a solid elastic material, and also has a seal portion, formed of a sponge elastic material and hollow-shaped and adapted to be pressure-contacted to a peripheral portion of the door when the door is closed, the seal portion being connected at a first connection portion and at a second connection portion placed closer to a leading end of the outer side wall portion than the first connection portion. This weather strip comprises a projecting portion provided at at least one of the first connection portion and the second connection portion in such a way as to have a part extending outwardly from the outer side wall portion and as to be connected to the seal portion at an end portion of the part. In this weather strip, a sponge layer extending from the seal portion is provided on an outer surface of the projecting portion, which is opposite to a side facing a hollow part of the seal portion.

The above weather strip of the invention is provided with a sponge layer extending from the seal portion on an outer surface of the projecting portion. Consequently, material differences, an outside line, and step-like parts do not occur in the boundary portion between the leading end part of the second projection portion and the seal portion. Thus, the quality of the appearance can be enhanced. This eliminates the necessity for performing, after the forming of the weather strip, surface treatment on the surface of the seal portion so as to obscure the outside line and the step-like portion. Thus, reduction in the production cost, and simplification of the manufacturing process can be achieved. Additionally, in the connection portion between the seal portion and the projecting portion, the ratio of the projecting portion thereto does not decrease, as compared with the case of tapering the seal portion toward an end part thereof. Therefore, in this connection portion, predetermined stiffness is maintained. The advantages of providing the projecting portion therein are retained.

In the above structure, a film layer may be provided on outer surface of each of the seal portion and the projecting portion. In this weather strip, a sponge layer extending from the seal portion may be provided between an outer surface of the projecting portion and the film layer.

In an embodiment of the invention, a thickness of the film layer is preferably equal to or less than 0.4 mm.

According to the above structure, the thickness of the film layer is equal to or less than 0.4 mm. When the thickness of the film layer is more than 0.4 mm, such a thick film layer can absorb the material difference between the seal portion and the projecting portion. Thus, no outside line and step-like parts are formed between the seal portion and the projecting portion through the film layer. Consequently, the manufacturing process becomes troublesome (due to double-coating or several-coating). Moreover, when the film layer is thickened, the seal portion gradually loses flexibility. Therefore, preferably, the film layer is thin as much as possible. Thus, the thickness of the film layer may be less than, for example, 0.1 mm. However, the film layer should have a certain thickness necessary for maintaining the nonabrasiveness and durability of the seal portion. Thus, it is preferable that the thickness of the film layer is equal to and more than 0.1 mm and equal to or less than 0.4 mm.

In the above structure, a thickness of the sponge layer is preferably equal to or more than 0.4 mm.

According to the above structure, the thickness of the sponge layer is equal to or more than 0.4 mm. When the thickness of the sponge layer is less than 0.4 mm, the material characteristic of the sponge rubber is difficult to exhibit. Thus, the advantages of providing the sponge layer in the weather strip are reduced. Consequently, there is a fear that the weather strip cannot solve the drawback that an outside line is formed. Thus, it is preferable that the thickness of the sponge layer is set to be equal to or more than 0.4 mm. Incidentally, when the sponge layer is excessively thickened, the percentage of the projecting portion in the connection portion between the seal portion and the projecting portion decreases. Consequently, it is more difficult to maintain the predetermined stiffness of the connection portion. Therefore, it is preferable that the thickness of the sponge layer is equal to and more than 0.4 mm and equal to or less than 0.6 mm.

In an embodiment of the invention, the sponge layer preferably reaches the outer side wall portion.

According to the above structure, the sponge layer extending from the seal portion reaches the outer side wall portion. That is, the outer surface of the projecting portion is covered with the sponge layer. Consequently, the boundary portion between the seal portion and the projecting portion, that is, the outside line and the step-like part are not formed on a design surface (that is, the outer surface). Consequently, the advantages, such as the enhancement of the quality of the appearance, can more reliably be obtained.

In an embodiment of the invention, at the second connection portion, an outer surface of the projecting portion is connected to a leading end part of the outer side wall portion. Further, the sponge layer reaches the leading end part of the outer side wall portion.

The above structure of the invention obtains advantages similar to the advantages as aforementioned. Moreover, because the sponge layer reaches the leading end part of the outer side wall portion, the boundary portion (including, for instance, an outside line and a step-like portion) between the seal portion and the outer side wall portion is not formed on a design surface. The quality of the appearance can be enhanced still more.

In an embodiment of the invention, a thickness of the sponge layer is preferably substantially uniform over the entirety thereof.

According to the above, the material differences are hard to occur among parts of the sponge layer. Consequently, the quality of the appearance can be enhanced still more.

In an embodiment of the invention, a thickness of the end portion of the part of the projecting portion is preferably equal to or more than half of a thickness of the seal portion at a boundary portion between the end portion and the seal portion.

According to the above structure of the invention, the thickness of the end portion of the part of the projecting portion is equal to or more than half of the thickness of the seal portion at the boundary portion between the end portion and the seal portion. That is, "the thickness of the sponge layer at the boundary portion between the end portion of the part of the projecting portion and the seal portion is less than half of the thickness of the seal portion at this boundary portion". Thus, the stiffness of the projecting portion can be assured. This can more reliably prevent occurrences of the drawbacks, for example, in that the seal portion falls down. Incidentally, it is preferable for more reliably ensuring the stiffness of the projecting portion that the thickness of the leading end part of the projecting portion is equal to or more than two-thirds of the thickness of the seal portion at the boundary portion between this leading part and the seal portion. That is, preferably, the thickness of the sponge layer at the boundary portion between the end portion of the part of the projecting portion and the seal portion is less than one-third of the thickness of the seal portion at this boundary portion.

DETAILED DESCRIPTION OF THE PREFERRED EMBODIMENTS

First Embodiment

Hereinafter, an embodiment of the invention is described by referring to the accompanying drawings.

Figure 1:
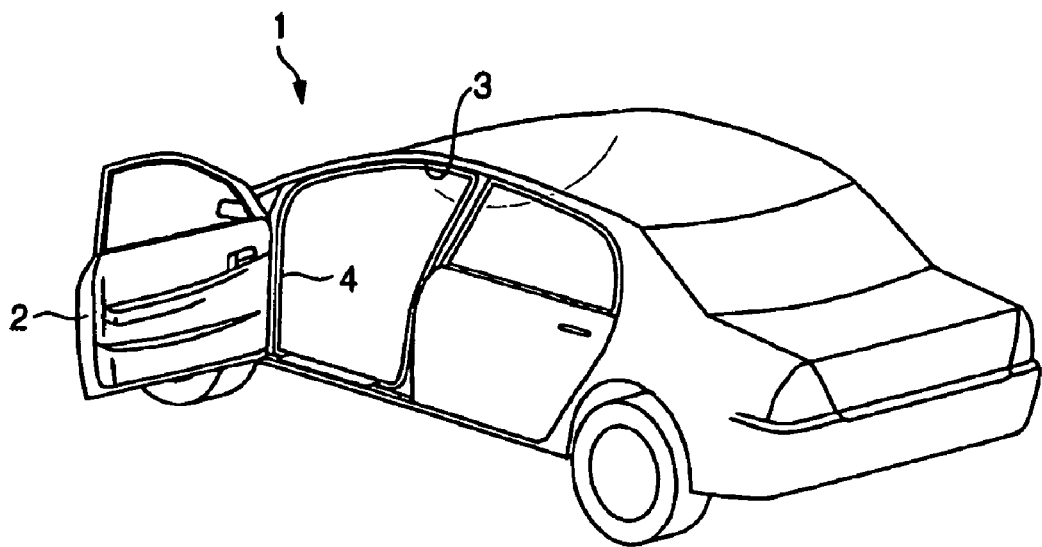
FIG. 1 is a perspective view showing an automobile.
Figure 2:
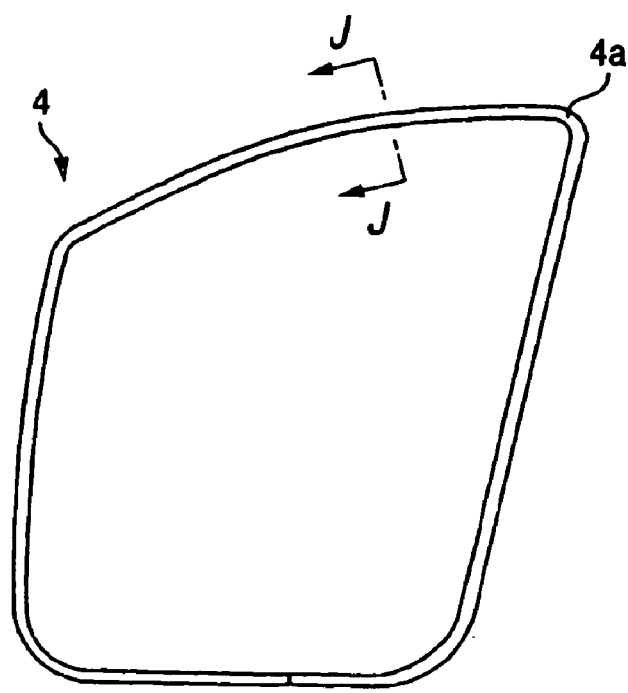
FIG. 2 is a front view showing a weather strip according to an embodiment of the invention.

As shown in FIG. 1, a door 2 is openably and closably provided in a side portion of the automobile 1. A weather strip 4 is attached to the surrounding part of a door opening 3 at the body side corresponding to the door 2. As shown in FIG. 2, the weather strip 4 according to this embodiment is formed like a ring. The weather strip 4 is entirely extrusion-molded.

Figure 3:
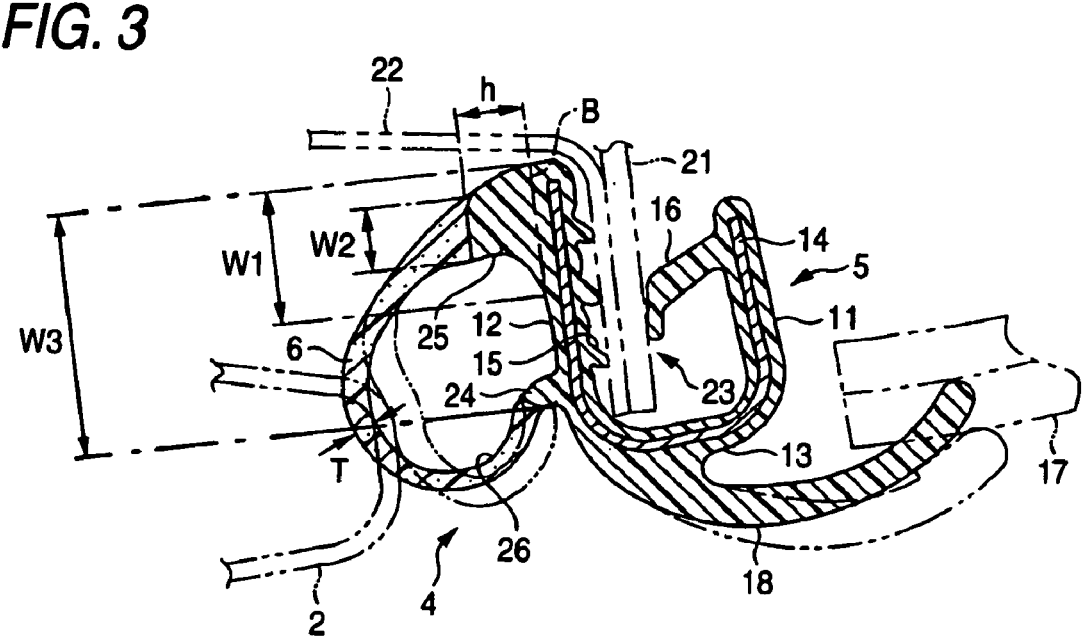
FIG. 3 is a sectional view, taken on line J—J of FIG. 2, showing a first embodiment of the present invention.

As shown in FIG. 3, the weather strip 4 has a trimming portion 5 and a seal portion 6.

The trimming portion 5 has an inner side wall portion 11, an outer side wall portion 12, and a connection portion 13 having a cross-sectionally curved shape. The trimming portion 5 is cross-sectionally substantially-U-shaped as a whole. The trimming portion 5 is made of solid EPDM (ethylene-propylene-diene copolymer) rubber. A metallic insert 14 is embedded therein.

A plurality of holding lips 15 each extending to the inside of the trimming portion 5 (that is, to the inside of the vehicle) are formed on the inner surface (that is, the inner side surface) of the outer side wall portion 2 in such a way as to be integral therewith. A holding lip 16 extending to the inside of the trimming portion 5 (that is, to the outside of the vehicle) is formed on the inner surface (that is, the outer side surface) of the inner side wall portion 11 in such a manner as to be integral therewith. A cover lip 18 for covering an end portion of an interior member 17, such as a garnish, is formed in the connection portion 13 in such a way as to be integral therewith.

A flange 23 is formed in the surrounding part of the door opening 3 by joining an inner panel 21 and an outer panel 22 of the body. The trimming portion 5 is fitted onto this flange 23, so that the weather strip 4 is held on the surrounding part of the door opening 3.

On the other hand, the seal portion 6 is provided at the outer side of the outer side wall portion 12, and made of EPDM sponge rubber in such a way as to be hollow. When the door 2 is closed, the peripheral portion of the door 2 is pressure-contacted to the seal portion 6, so that the space between the door 2 and the body of the automobile 1 is sealed.

Hereinafter, the configuration of each of the seal portion 6 and the outer side wall portion 12 is described in more detail. A first projection portion 24 is formed on an outer surface (a plane denoted by the line extended from "B" in FIG. 3) of the outer side wall portion 12 in such a way as to extend toward the outside of the automobile in the vicinity of the boundary portion between the connecting portion 13 and the outer side wall portion 12. A second projection portion 25 is formed at a leading portion of the outer side wall portion 12 in such a way as to extend toward the outside of the automobile.

The seal portion 6 is cross-sectionally substantially-D-shaped. One of end parts of the seal portion 6 is connected to a leading end part of the first projection portion 24, while the other end part of the seal portion 6 is connected to a leading end part of the second projection portion 25. The entire seal portion 6 is placed closer to the first projection portion 24 than the second projection portion 25, that is, placed at the side of the inner periphery of the weather strip 4. Therefore, a connection portion to be connected to the first projection portion 24 corresponds to the first connection portion. A connection portion to be connected to the second projection portion 25 corresponds to the second connection portion.

The second projection portion 25 is cross-sectionally shaped substantially like a trapezoid as a whole, so that the thickness W1 of a base end portion B thereof is larger than the thickness W2 of a leading end portion thereof. The outer surface of the second projection portion 25 is cross-sectionally shaped like a circular arc in such a way as to be inclined toward the inner periphery of the weather strip 4 as extending from the leading end part of the outer side wall portion 12 to the outside thereof. A side surface facing a hollow part 26 of the seal portion 6 is cross-sectionally shaped substantially like a circular arc in such a manner as to be continued from the outer surface of the outer side wall portion 12. An outer surface of the seal portion 6 in the neighborhood of the second projection portion 25 is inclined toward the inner periphery of the weather strip 4 as extending to the outside of the vehicle, in such a way as to be continued to the outer surface of the second projection portion 25.

Incidentally, in this embodiment, the thicknesses W1 and W2 of the second projection portion 25 extending along the outer side wall portion 12 are set such that the thickness W1 at the base end portion B is about 7 mm, and that the thickness W2 at the leading end part is about 3 mm. The projection length h from the base end portion to the leading end part of the second projection portion 25 is about 3.5 mm. The section area of the second projection portion 25 is about 17.5 mm$^2$. Incidentally, the thickness W1 of the base end portion B is substantially half the length (=about 14 mm; W3 in FIG. 3) from the leading end part of the outer side wall portion 12 to the boundary portion between a connecting portion 13 and the base end portion B.

The thickness T of the seal portion 6 is about 1.2 mm in a range from a general part, that is, the first projection portion 24 to a place located slightly back of the second projection portion 25 (incidentally, this range includes a part pressure-contacted to the peripheral portion of the door 2 and the proximity thereof: general part).

Incidentally, the thickness, the projection length, and the sectional area of the second projection portion 25 are set in consideration of the relevance of them with an amount of the bending deformation at the corner portion of the weather strip 4, the bending load and the sealability of the seal portion 6 during the door 2 is closed, and the closing property of the door 2. Needless to say, the relevance of them with the thickness (T) of the seal portion 6, and the relevance of them with the thickness (W1, W2), the projection length (h), and the sectional area of each of the parts of the second projection portions 25 are taken into consideration. For example, when the thickness of the seal portion 6 is changed, the thickness of the second projection portion 25 is also changed into a more appropriate value. When the projection length (h) is changed, the thickness (W1, W2) of each of the parts of the second projection portion 25 is changed into a more suitable value.

As described above in detail, the second projection portion is formed in such a way as to extend from the trimming portion 5, which has stiffness higher than that of the seal portion 6, in the connection portion between the seal portion 6 and the outer side wall portion 12 at the side of the outer periphery of the weather strip 4, that is, at the side where an amount of the bending deformation becomes larger when the corner portion of the weather strip 4 is molded. Moreover, the thickness W1 and the projection length h along the of the second projection portion 25 are larger than the thickness T of the general part of the seal portion 6. Practically, at the base end portion of the second projection portion 25, the thickness (W1) thereof is about six times the thickness T of the general part of the seal portion 6. At the leading end part thereof, the thickness (W2) thereof is about three times or less the thickness T of the general part of the seal portion 6. Furthermore, the projection length (h) of the second projection portion 25 is about three times the thickness (T) of the general part of the seal portion 6.

Thus, an occurrence of collapse of the seal portion 6 can be prevented by support of the projection portion 25 even when molding a corner portion 4a (see FIG. 2) of the weather strip 4 corresponding to a corner portion of the surrounding part of the door opening 3, at which a bending angle is very acute (in this embodiment, a corner portion constituted by a center pillar portion and a roof side portion). Consequently, the insertion of the pad into the seal portion and the die-forming of the seal portion become unnecessary. Thus, reduction in the production cost of the weather strip and the simplification of the manufacturing process thereof can be performed. Moreover, this embodiment obtains advantages, such as enhancement of the quality of the appearance of the weather strip, are obtained because of the facts that no difference in the quality between the extrusion-molding part and the injection-molding part occurs, and that the degree of deformation of the seal 6 is reduced. With the aforementioned configuration, the drawback of formation of a double outside line even in case of an occurrence of bending-deformation of the seal portion 6 is hard to occur. Additionally, with the aforementioned configuration, the bending-load increase due to the insertion of the pad during the door 2 is closed, that is, increase of a reaction force in the seal portion 6 does not occur. Thus, there is little influence on the closing property of the door 2.

The seal portion 6 is cross-sectionally shaped substantially like a letter D. The entire seal portion 6 is placed to the side of the inner periphery of the weather strip 4 in the direction along the outer side wall portion 12 from the position of the second projection portion 25. That is, the entire seal portion 6 does not project from the second projection portion 25 to the direction of the outer periphery of the weather strip 4, along which the amount of the bending-deformation of the seal portion 6 increases. With this configuration, the seal portion 6 can more effectively be prevented from being collapsed when the corner portion of the weather strip 4 is formed. Moreover, this configuration more effectively prevents an occurrence of the drawback that a double outside line is formed even when the seal portion 6 is bend-deformed. Incidentally, although abridge to be provided in the hollow seal portion is considered as means for preventing an occurrence of collapse, a plurality of hollow parts are formed in the seal portion, so that the molding is difficult to perform and time-consuming. Furthermore, the provision of the bridge therein results in the formation of an outside line on the surface of the seal portion 6. This deteriorates the appearance of the weather strip and causes the drawbacks that the reaction force of the seal portion is increased, and that the closing property of the door is reduced. The weather strip 4 according to this embodiment can prevent an occurrence of such drawbacks as much as possible. Moreover, the invention enhances productivity.

Incidentally, the invention is not limited to the embodiment described in the foregoing description. The invention may be practiced, for example, in the following manners. Needless to say, other alterations and modifications, which are not exemplified below, may be made.

(a) According to the aforementioned embodiment, the invention is implemented as the weather strip 4 to be provided along the surrounding part of the body-side door opening 3 corresponding to the (side front) door 2. However, the invention can be applied to weather strips provided the peripheral portions of other doors, such as a rear door, a back door, a luggage door (that is, a trunk lid), and a roof door (a sliding roof panel).

(b) The value of the thickness W1 at the base end portion B of the second projection portion 25 is not limited to that described in the foregoing description of the embodiment. It is sufficient that the thickness W1 is larger than at least the thickness T of the general part of the seal portion 6. Incidentally, preferably, the thickness W1 of the base end portion B of the second projection portion 25 is two times or more the thickness T of the general part of the seal portion 6 in consideration of making the second projection portion 25 have the predetermined stiffness to thereby reduce an amount of the bending deformation of the seal portion 6, which is caused when the corner portion of the weather strip 4 is formed. Further, preferably, the thickness W1 of the base end portion B of the second projection portion 25 is equal to or more than two times the thickness T of the general part of the seal portion 6 and equal to or less than six times the thickness T in consideration of the relevance between the thickness W1 and the thickness (T) of the seal portion 6, and the relevance among the thickness (W1, W2), the projection length (h), and the sectional area of each of the parts of the second projection portions 25. For instance, in the case of configuring the weather strip 4 so that at least one of the outer side surface of the second projection portion 25 and the side surface of the hollow portion 26 and a side surface of the outer side wall portion 12 meet substantially at right angles, it is more preferable that the thickness W1 of the base end part B of the second projection portion 25 is equal to or more than two times the thickness T of the general part of the seal portion 6 and equal to or less than four times the thickness T thereof.

Furthermore, it is more preferable for the aforementioned reason that the thickness W1 of the base end part B of the second projection portion 25 is set to be equal to or more than one-fourth of the length W3 from the leading end part of the outer side wall portion 12 to the boundary portion between the second projection portion 25 and the connecting portion 13, and also set to be equal to or less than a half this length. Similarly to the aforementioned case, when a side surface of the second projection portion 25 and a side surface of the outer side wall portion 12 meet substantially at right angles, it is more preferable that the thickness W1 is equal to or more than one-fourth of the length W3 and equal to or less than one-third of the length W3.

(c) The value of the thickness W2 of the leading end portion of the second projection portion 25 is not limited to that described in the foregoing description of the embodiment. It is sufficient that the thickness W2 is larger than at least the thickness T of the general part of the seal portion 6. It is preferable for the reason similar to that described in the item (b) to set the thickness W2 of the leading end part of the second projection portion 25 to be equal to or more than twice the thickness T of the general part of the seal portion 6. More preferably, the thickness W2 of the leading end part of the second projection portion 25 is equal to or more than twice the thickness T of the general part of the seal portion 6 and equal to or less than three times the thickness T thereof.

(d) The value of the projection length h from the base end part of the second projection portion 25 to the leading end part thereof is not limited to that described in the description of the aforementioned embodiment. It is sufficient that the projection length h is larger than at least the thickness T of the general part of the seal portion 6. It is preferable for the reason similar to that described in the item (b) to set the projection length h to be equal to or more than twice the thickness T of the general part of the seal portion 6. More preferably, the projection length h is equal to or more than twice the thickness T of the general part of the seal portion 6 and equal to or less than four times the thickness T thereof.

(e) The value of the sectional area of the second projection portion 25 is not limited to that described in the description of the aforementioned embodiment. It is preferable for the reason similar to that described in the item (b) to set the sectional area of the second projection portion 25 to be equal to or more than four times the area obtained by the square of the thickness T of the general part of the seal portion 6. More preferably, the sectional area of the second projection portion 25 is equal to or more than four times the area obtained by the square of the thickness T of the general part of the seal portion 6 and equal to or less than fourteen times the thickness T. As described above, in the case where a side surface of the second projection portion 25 and a side surface of the outer side wall portion 12 meet substantially at right angles, it is preferable that the sectional area of the second projection portion 25 is equal to or more than four times the area obtained by the square of the thickness of the general part of the seal portion 6 and equal to or less than ten times the area obtained by the square of the thickness of the general part.

(f) Although EPDM is as the material of the weather strip 4 in the aforementioned embodiment, other rubber materials, such as IR (isoprene rubber) and CR (chloroprene rubber), may be used. Further, the weather strip 4 may be made of other elastic materials, such as thermoplastic olefin (TPO) or soft polyvinyl chloride, having elastomeric properties.

(g) Although the weather strip 4 is provided over the entire surrounding part of the door opening in the aforementioned embodiment, it is not always necessary that the weather strip 4 is provided over the entire surrounding part. For example, the weather strip 4 may be provided along only a part of the entire surrounding part of the door opening. The weather strip may be formed like a ring by first die-forming rectilinear parts and then connecting the injection-molding rectilinear parts to the remaining parts. That is, the weather strip may partly have injection-molding parts.

Second Embodiment

Hereinafter, another embodiment of the invention is described by referring to the accompanying drawings.

Figure 4:
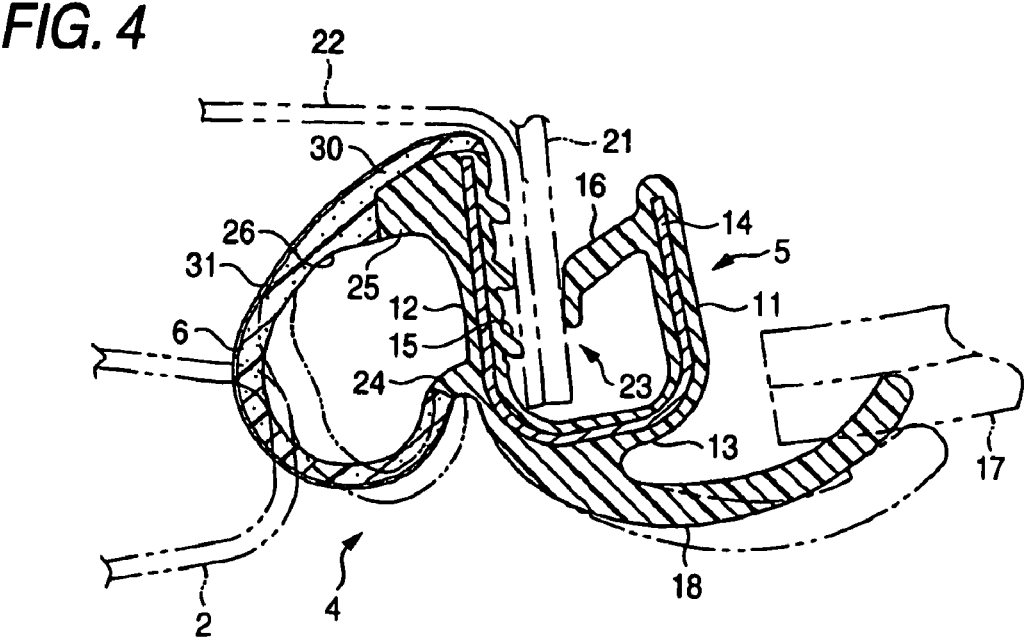
FIG. 4 is a sectional view, taken on line J—J of FIG. 2, showing a second embodiment of the weather strip.
Figure 5:
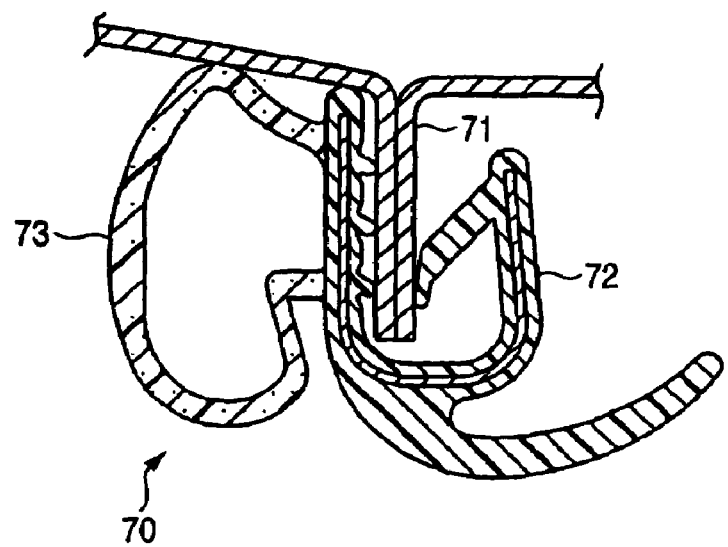
FIG. 5 is a sectional view showing a related weather strip.
Figure 6:
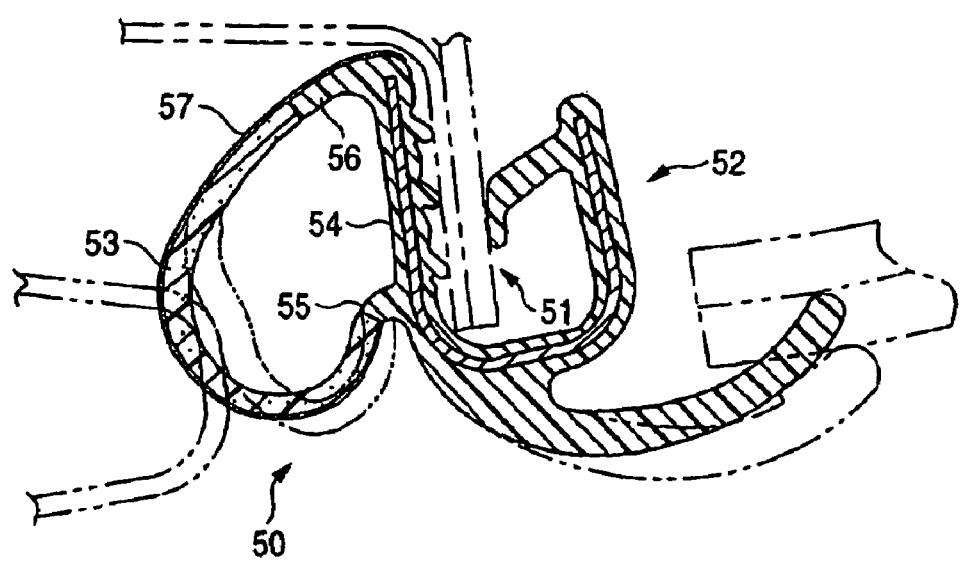
FIG. 6 is a sectional view showing a related weather strip.

As shown in FIG. 4, the weather strip 4 also has a trimming portion 5 and a seal portion 6.

The trimming portion 5 has an inner side wall portion 11, an outer side wall portion 12, and a connection portion 13 having a cross-sectionally curved shape. The trimming portion 5 is cross-sectionally substantially-U-shaped as a whole. The trimming portion 5 is made of solid EPDM (ethylene-propylene-diene copolymer) rubber serving as a solid elastic material. A metallic insert 14 is embedded therein.

A plurality of holding lips 15 each extending to the inside of the trimming portion 5 (that is, to the inside of the vehicle) are formed on the inner surface (that is, the inner side surface) of the outer side wall portion 2 in such a way as to be integral therewith. A holding lip 16 extending to the inside of the trimming portion 5 (that is, to the outside of the vehicle) is formed on the inner surface (that is, the outer side surface) of the inner side wall portion 11 in such a manner as to be integral therewith. A cover lip 18 for covering an end portion of an interior member 17, such as a garnish, is formed in the connection portion 13 in such a way as to be integral therewith.

A flange 23 is formed in the surrounding part of the door opening 3 by joining an inner panel 21 and an outer panel 22 of the body. The trimming portion 5 is fitted onto this flange 23, so that the weather strip 4 is held on the surrounding part of the door opening 3.

On the other hand, the seal portion 6 is provided at the outer side of the outer side wall portion 12, and made of EPDM sponge rubber serving as a sponge elastic material in such a way as to be hollow. When the door 2 is closed, the peripheral portion of the door 2 is pressure-contacted to the seal portion 6, so that the space between the door 2 and the body of the automobile 1 is sealed.

Hereinafter, the configuration of each of the seal portion 6 and the outer side wall portion 12 is described in more detail. A first projection portion 24 is formed on an outer surface of the outer side wall portion 12 in such a way as to extend toward the outside of the automobile in the vicinity of the boundary portion between the connecting portion 13 and the outer side wall portion 12. A second projection portion 25 is formed at a leading portion of the outer side wall portion 12 in such a way as to extend toward the outside of the automobile.

The seal portion 6 is cross-sectionally substantially-D-shaped. One of end parts of the seal portion 6 is connected to a leading end part of the first projection portion 24, while the other end part of the seal portion 6 is connected to a leading end part of the second projection portion 25. The entire seal portion 6 is placed closer to the first projection portion 24 than the second projection portion 25, that is, placed at the side of the inner periphery of the weather strip 4. Therefore, a connection portion to be connected to the first projection portion 24 corresponds to the first connection portion. A connection portion to be connected to the second projection portion 25 corresponds to the second connection portion.

The second projection portion 25 is cross-sectionally shaped substantially like a trapezoid as a whole, so that the thickness of the base end portion thereof is larger than the thickness of the leading end portion thereof. The outer surface of the second projection portion 25 is cross-sectionally shaped like a circular arc in such a way as to be inclined toward the inner periphery of the weather strip 4 as extending from the leading end part of the outer side wall portion 12 to the outside thereof. A side surface facing a hollow part 26 of the seal portion 6 is cross-sectionally shaped substantially like a circular arc in such a manner as to be continued from the outer surface of the outer side wall portion 12. An inner surface thereof facing the hollow part 26 of the seal portion 6 is cross-sectionally shaped substantially like a circular arc in such a manner as to be continued from the outer surface of the outer side wall portion 12. The leading end part of the second projection portion 25 is substantially flat-shaped in such a way as to be almost parallel with the direction of thickness of the seal portion 6.

In this embodiment, the thickness of the leading end part of the second projection portion 25, which extends along the outer side wall portion 12, is about 1.2 mm. Incidentally, this thickness is equal to or more than two-thirds of the thickness of the seal portion 6, which is measured in the boundary portion (to be described later) between the leading end part thereof and the seal portion 6. Needless to say, the thickness of the base end part of the second projection portion 25 is larger than that of the leading end part thereof. The projection length from the base end part of the second projection portion 25 to the leading end part thereof is about 3.6 mm.

The thickness of the seal portion 6 is about 1.2 mm in a range from a general part, that is, the first projection portion 24 to a place located slightly back of the second projection portion 25 (incidentally, this range includes a part pressure-contacted to the peripheral portion of the door 2 and the proximity thereof). In the boundary portion between the leading end part of the second projection portion 25 and the seal portion 6, the thickness of the seal portion 6 is about 1.7 mm.

Incidentally, the thickness and the projection length of the second projection portion 25 are set in consideration of the relevance of them with an amount of the bending deformation at the corner portion of the weather strip 4, the bending load and the sealability of the seal portion 6 during the door 2 is closed, and the closing property of the door 2. Needless to say, the relevance of them with the thickness of the seal portion 6, and the relevance of them with the thickness and the projection length of each of the parts of the second projection portions 25 are taken into consideration. For example, when the thickness of the seal portion 6 is changed, the thickness of the second projection portion 25 is also changed into a more appropriate value. When the projection length is changed, the thickness of each of the parts of the second projection portion 25 is changed into a more suitable value.

In this embodiment, at the side of the outer surface of the second projection portion 25, a sponge layer 30 having a thickness of about 0.5 mm extending from the seal portion 6 is provided. Incidentally, the sponge layer 30 reaches a leading part of the outer side wall portion 12 from the seal portion 6. The thickness of the sponge layer 30 is substantially uniform over the entirety thereof. Therefore, in the vicinity of the second projection portion 25, the outer surfaces of the seal portion 6 and the sponge layer 30 are inclined toward the side of the inner periphery of the weather strip 4 in such a way as to extend along the outer surface of the second projection portion 25 toward the outside of the automobile. A film layer 31, which is made of solid EPDM rubber and has a thickness of about 0.1 mm, is formed on the outer surfaces of the seal portion 6 and the sponge layer 30.

As described above in detail, the sponge layer 30 extending from the seal portion 6 is provided on the outer surface of the second projection portion 25. Consequently, material differences, an outside line, and step-like parts do not occur in the boundary portion between the leading end part of the second projection portion 25 and the seal portion 6. Thus, the quality of the appearance can be enhanced. This eliminates the necessity for performing, after the forming of the weather strip 4, surface treatment on the surface of the seal portion 6 so as to obscure the outside line and the step-like parts. Thus, reduction in the production cost, and simplification of the manufacturing process can be achieved. Additionally, in the connection portion between the seal portion 6 and the second projection portion 25, the ratio of the second projection portion 25 thereto does not decrease, as compared with the case of tapering the seal portion 6 toward an end part thereof. Therefore, in this connection portion, predetermined stiffness is maintained. The advantages of providing the second projection portion 25 therein are retained.

The sponge layer 30 extending from the seal portion 6 reaches the leading end part of the outer side wall portion 12. Thus, the outer surface of the second projection portion 25 is covered with the sponge layer 30. Consequently, the boundary portion between the seal portion 6 and the outer side wall portion 12 does not appear on a design surface (for instance, a part that can relatively easily and visually be identified from the outside of a vehicle). The quality of the appearance can be enhanced still more.

Because the thickness of the sponge layer 30 is substantially uniform over the entirety thereof, the material differences are hard to occur among parts of the sponge layer. Consequently, the quality of the appearance can be enhanced still more.

The thickness of the leading end part of the second projection portion 25 is equal to or more than two-thirds of the thickness of the seal portion 6 at the boundary portion between this leading part and the seal portion 6. That is, the thickness of the sponge layer 30 at this boundary portion is less than one-third of the thickness of the seal portion 6 at this boundary portion. Thus, the stiffness of the second projection portion 25 can be assured. This can more reliably prevent an occurrence of the drawback that the seal portion 6 falls down.

In the case where the weather strip 50 is extrusion-molded as described in the foregoing description of the related art, a part constituting the seal portion 53 is vulcanized and foamed when extruded from a mouthpiece of a manufacturing apparatus. Thus, the seal portion is made of sponge rubber. Therefore, the seal portion 53 extruded from the mouthpiece is expanded, so that the thickness of the seal portion 53 is increased. On the other hand, a part constituting the projection portion 56 is not foamed. Thus, the condition of this part extruded from the mouthpiece is maintained. Consequently, during fabrication, a step-like portion is liable to be formed at the boundary portion between the seal portion 53 and the projection portion 56. Moreover, there is a fear that the boundary portion is put into a corrugated state. Therefore, occurrences of the drawbacks are suppressed by placing the sponge layer 30 at the side of the outer surface of the second projection portion 25.

Incidentally, the invention is not limited to the embodiment described in the foregoing description. The invention may be practiced, for example, in the following manners. Needless to say, other alterations and modifications, which are not exemplified below, may be made.

(a) According to the aforementioned embodiment, the invention is implemented as the weather strip 4 to be provided along the surrounding part of the body-side door opening 3 corresponding to the (side front) door 2. However, the invention can be applied to weather strips provided the s of other doors, such as a rear door, a back door, a luggage door (that is, a trunk lid), and a roof door (a sliding roof panel).

(b) Although the thickness of the film layer 31 is about 0.1 mm in the aforementioned embodiment, the thickness thereof is not limited thereto. It is sufficient that the thickness thereof is equal to or less than 0.4 mm. When the thickness of the film layer 31 is more than 0.4 mm, such a thick film layer 31 can absorb the material difference between the seal portion 6 and the second projection portion 25. Thus, no outside line and step-like parts are formed between the seal portion 6 and the second projection portion 25 through the film layer 31. Consequently, the advantages of the aforementioned embodiment are reduced. Incidentally, when the film layer 31 is thickened, the seal portion 6 gradually loses flexibility. Therefore, preferably, the film layer 31 is thin as much as possible. Thus, the thickness of the film layer 31 maybe less than, for example, 0.1 mm. However, the film layer 31 should have a certain thickness necessary for maintaining the nonabrasiveness and durability of the seal portion 6. Thus, it is preferable that the thickness of the film layer 31 is equal to and more than 0.1 mm and equal to or less than 0.4 mm.

Although the film layer 31 is made of solid EPDM rubber in the aforementioned embodiment, the material of the film layer 31 is not limited thereto. The film layer 31 may be made of, for example, thermoplastic olefin (TPO). Additionally, the material of the film layer 31 is not limited to solid rubber. The film layer 31 may be made of foamed TPO. Although the surface shape of the aforementioned embodiment is not referred to in the foregoing description of the embodiment, for example, embossing may be performed on the surface of the film layer 31.

Needless to say, the configuration of a weather strip according to the invention is not limited to that of the aforementioned embodiment. A weather strip may be configured by omitting the film layer 31.

Although the thickness of the sponge layer 30 is about 0.5 mm in the aforementioned embodiment, the thickness thereof is not limited thereto. It is sufficient that the thickness thereof is equal to or less than 0.4 mm. When the thickness of the sponge layer 30 is less than 0.4 mm, the material characteristic of the sponge rubber is difficult to exhibit. Thus, the advantages of providing the sponge layer 30 in the weather strip are reduced. Consequently, there is a fear that the weather strip cannot solve the drawback that an outside line is formed. Thus, it is preferable that the thickness of the sponge layer is set to be equal to or more than 0.4 mm. Incidentally, when the sponge layer 30 is excessively thickened, the percentage of the second projection portion 25 in the connection portion between the seal portion 6 and the second projection portion 25 decreases. Consequently, it is more difficult to maintain the predetermined stiffness of the connection portion. Therefore, it is preferable that the thickness of the sponge layer 30 is equal to and more than 0.4 mm and equal to or less than 0.6 mm.

(d) In the aforementioned embodiment, the thickness of the leading end part of the second projection portion 25 is equal to or more than two-thirds of the thickness of the seal portion 6, which is measured at the boundary portion between this leading end part and the seal portion 6. That is, the thickness of the sponge layer 30 at the boundary portion is less than one-third of the thickness of the seal portion 6 at this boundary portion. Additionally, it is sufficient that the thickness of the leading end part of the second projection portion 25 is equal to or more than half of the thickness of the seal portion 6 at the boundary portion between this leading end part and the seal portion 6. That is, it is sufficient that at the boundary portion between the leading end part of the second projection portion 25 and the seal portion 6, the thickness of the sponge layer 30 is less than half of the thickness of the seal portion 6 at the boundary portion.

(e) Although the sponge layer 30 is provided only on the outer surface side of the second projection portion 25 in the aforementioned embodiment, another sponge layer may be also provided on the outer surface side of the first projection portion 24. In this case, similarly to the aforementioned embodiment, the outer surface of the first projection portion 24 is covered with the sponge layer by setting the sponge layer in such a way as to reach the outer side wall portion 12. Consequently, the boundary portion between the seal portion 6 and the first projection portion 24, that is, an outside line and a step-like part are not formed on a design surface. Consequently, the advantages, such as the enhancement of the quality of the appearance, can more reliably be obtained. Incidentally, the configuration, in which the sponge layer reaches the outer side wall portion 12, more effectively provides the advantages by being applied to a weather strip adapted so that the first projection portion 24 is visually identified from the outside of the automobile relatively easily, and a weather strip in which the second projection portion 25 is provided slightly closer to the connecting portion 13 than the leading end part of the outer side wall portion 12.

(f) Although EPDM is as the material of the weather strip 4 in the aforementioned embodiment, other rubber materials (elastic materials), such as IR (isoprene rubber) and CR (chloroprene rubber), may be used. Further, the weather strip 4 may be made of other elastic materials, such as thermoplastic olefin (TPO) or soft polyvinyl chloride, having elastomeric properties.

(g) Although the weather strip 4 is provided over the entire surrounding part of the door opening in the aforementioned embodiment, it is not always necessary that the weather strip 4 is provided over the entire surrounding part. For example, the weather strip 4 may be provided along only a part of the entire surrounding part of the door opening.

Although the weather strip 4 is entirely formed by extrusion-molding, the invention is not limited to this weather strip 4. A weather strip partly injection-molded may be employed as a weather strip according to the invention.

Of course, the sponge layer 20 or the film layer 31 can be incorporated into weather strip according to the first embodiment.

This invention is not limited to the above description of the mode for carrying out the invention and embodiments thereof at all, and includes various modifications that can be conceived by those skilled in the art without departing from the scope of the claims.

What is claimed is:

1. A weather strip comprising:
   a trimming portion having a substantially U-shaped cross section and attachable to a surrounding part of a door opening of a vehicle, said trimming portion having an outer side wall portion, an inner side wall portion, and a connecting portion for connecting said outer and inner side wall portions to each other; and
   a hollow seal portion connected to said trimming portion at a first connection portion, which is placed substantially at a boundary portion between said connecting portion and said outer side wall portion, and at a second connection portion, which is placed closer to a leading end of said outer side wall portion than said first connection portion, and adapted to be more flexible than said trimming portion;
   a projecting portion provided in said second connection portion in such a way as to extend from said outer side wall portion of said trimming portion,
   wherein a first thickness of said projecting portion along a direction, in which said outer side wall portion extends, is larger than a second thickness of a part of said seal portion, which is pressure-contacted to a peripheral portion of the door,
   wherein a third thickness of a leading end part of said projecting portion is at least twice the second thickness, and
   wherein a projection length from a base end part of said projecting portion to a leading end part thereof is larger than the second thickness.

2. A weather strip according to claim 1, wherein a fourth thickness of a base end part of said projecting portion is at least twice the second thickness.

3. A weather strip according to claim 1, wherein a fourth thickness of base end part of said projecting portion is equal to or more than one-fourth of a length from a leading end part of said outer side wall portion to a boundary portion between said connecting portion and said base end part.

4. A weather strip according to claim 1, wherein the projection length is at least twice the second thickness.

5. A weather strip according to claim 1, wherein a sectional area of said projecting portion is equal to or more than four times an area obtained by square of the second thickness.

6. A weather strip according to claim 1, wherein the entirety of said seal portion is formed in such a way as to be placed closer to a side of said first connection portion than at least said second connection portion in the direction, in which said outer side wall portion extends.

7. A weather strip according to claim 1, further comprising a sponge layer extending from said seal portion and provided on an outer surface of said projecting portion, which is opposite to a side facing a hollow part of said seal portion.

8. A weather strip according to claim 1, further comprising: a film layer provided on outer surface of each of said seal portion and said projecting portion; and a sponge layer extending from said seal portion and provided between an outer surface of said projecting portion and said film layer.

9. A weather strip according to claim 8, wherein a thickness of said film layer is equal to or less than 0.4 mm.

10. A weather strip according to claim 7, wherein a thickness of said sponge layer is equal to or more than 0.4 mm.

11. A weather strip according to claim 7, wherein said sponge layer reaches said outer side wall portion.

12. A weather strip according to claim 7, wherein at said second connection portion, an outer surface of said projecting portion is connected to a leading end part of said outer side wall portion, and wherein said sponge layer reaches said leading end part of said outer side wall portion.

13. A weather strip according to claim 7, wherein a thickness of said sponge layer is substantially uniform over the entirety thereof.

14. A weather strip according to claim 7, wherein a thickness of said end portion of said part of said projecting portion is equal to or more than half of a thickness of said seal portion at a boundary portion between said end portion and said seal portion.

15. A weather strip according to claim 8, wherein a thickness of said sponge layer is equal to or more than 0.4 mm.

16. A weather strip according to claim 8, wherein said sponge layer reaches said outer side wall portion.

17. A weather strip according to claim 8, wherein at said second connection portion, an outer surface of said projecting portion is connected to a leading end part of said outer side wall portion, and wherein said sponge layer reaches said leading end part of said outer side wall portion.

18. A weather strip according to claim 8, wherein a thickness of said sponge layer is substantially uniform over the entirety thereof.

19. A weather strip according to claim 8, wherein a thickness of said end portion of said part of said projecting portion is equal to or more than half of a thickness of said seal portion at a boundary portion between said end portion and said seal portion.

* * * * *